July 9, 1946.  R. L. GROOM ET AL  2,403,858
LIVE MINNOW AND SMALL FISH RECEPTACLE
Filed March 3, 1944  2 Sheets-Sheet 2

Inventors
R. L. Groom
R. E. Parrish, Sr.
By Wilfred E. Lawson
Attorney

Patented July 9, 1946

2,403,858

UNITED STATES PATENT OFFICE 2,403,858

LIVE MINNOW AND SMALL FISH RECEPTACLE

Roy L. Groom and Roger E. Parrish, Sr., Jackson, Tenn.

Application March 3, 1944, Serial No. 524,910

1 Claim. (Cl. 43—56)

The invention relates generally to the class of receptacles and pertains particularly to improvements in boxes or receptacles for the use of fishermen for the carrying of live bait such as minnows or small fish.

A primary object of the present invention is to provide a live bait box or receptacle for carrying and prolonging the life of minnows or small fish used for bait, such receptacle comprising a pair of compartments in which the minnows or small fish are placed, and a third or middle compartment for the storing of ice or other suitable refrigerant; the middle compartment being in communication with the pair of compartments so that there may be a free circulation of water and air between the three different compartments.

Another object of the invention is to provide a live bait and small fish box or receptacle in which the several compartments are arranged in longitudinal alignment so that the receptacle has the general form of a suit-case and is therefore easy to carry, the carrying handle for the receptacle being disposed at the transverse center thereof.

A further object of the invention is to provide a bait box or receptacle of the character stated, having a hinged top door or lid and having a carrying handle formed in two sections which are brought together over the top of the lid and which function to maintain the lid in closed position particularly when the receptacle is tipped for the purpose of emptying all or part of the liquid contents thereof.

The invention will be best understood from a consideration of the following detailed description taken in connection with the accompanying drawings with the understanding, however, that the invention is not confined to any strict conformity with the showing of the drawings but may be changed or modified so long as such changes or modifications mark no material departure from the salient features of the invention as expressed in the appended claim.

In the drawings

Figure 3 is a vertical transverse section taken on the line 3—3 of Figure 1 with certain parts of the handle portions omitted.

Figure 4 is a partial section taken on the line 4—4 of Figure 2.

Figure 1:
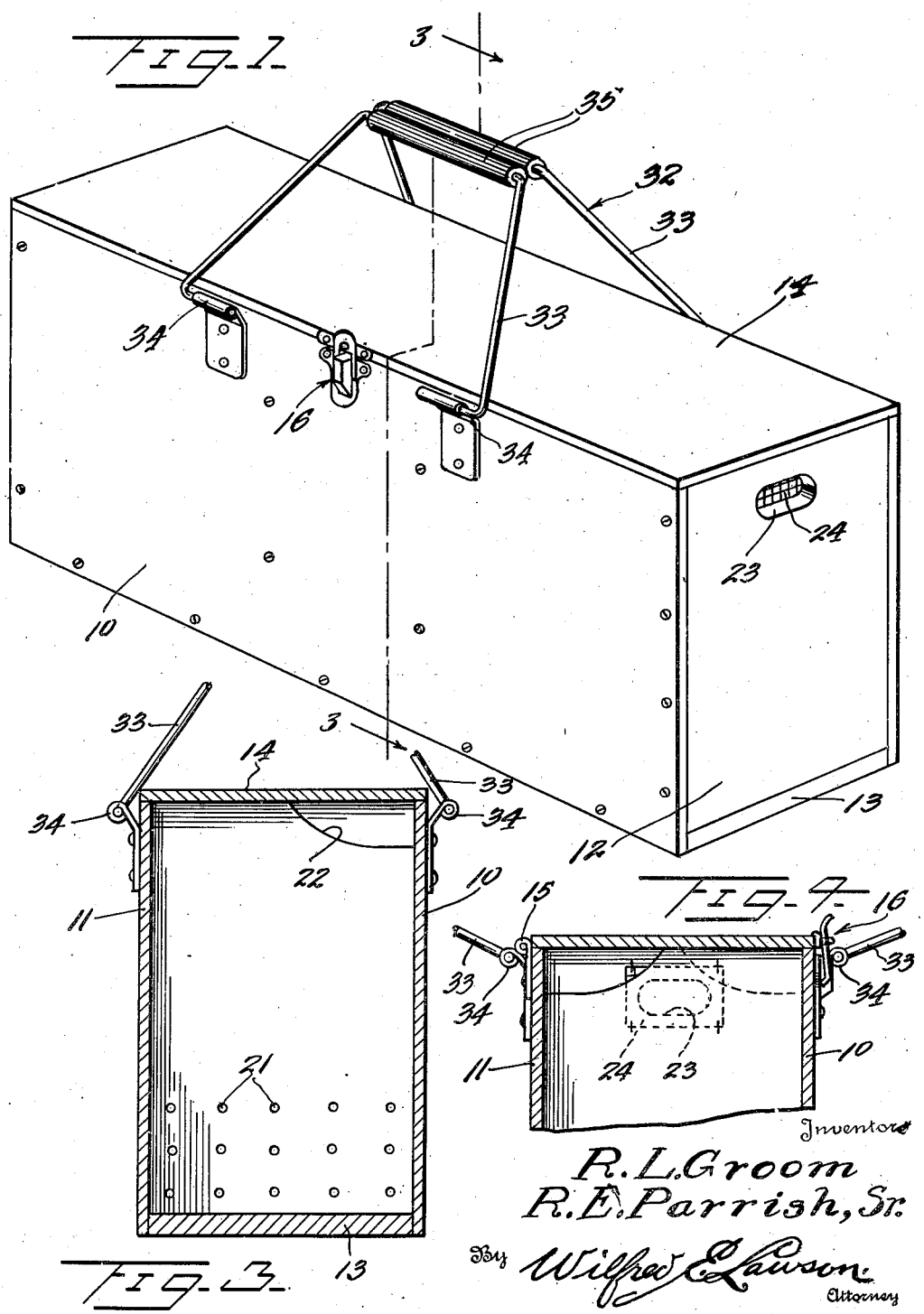
Figure 1 is a view in perspective of the bait and fish box or receptacle of the present invention.

Referring now more particularly to the drawings the bait and fish box or receptacle will be seen, upon reference to Figure 1, to be of elongated rectangular form, having the upright or vertical front and back walls 10 and 11 respectively, the end walls 12, the bottom 13 and the top wall cover 14.

The cover 14 is hingedly attached along one longitudinal edge, as at 15, to the back wall 11 while at the opposite longitudinal edge, preferably adjacent the transverse center, the cover carries the keeper of a lock or fastener which is generally designated 16 and by means of which te cover is secured in closed position.

Within the box are the two vertical spaced partition walls 17 which form between them the relatively narrow central chamber 18 and, in association with the adjacent end walls, the end chambers 19 and 20.

The central chamber is designed to receive a suitable refrigerant such as ice while the end chambers are provided to have placed therein live minnows, small fish or other live bait. The receptacle is, of course, water-tight and the three chambers are partly filled with water. In order that there may be the necessary circulation between the chambers so that the refrigerating action of the ice in the chamber 18 will be effective, the partition walls are provided with the apertures 21, adjacent the bottom wall 13 and at their top edges they are cut out as indicated at 22.

Each of the end walls 12 has an opening 23 formed therein adjacent the top, which opening is covered by the screen 24. These openings perform the double function of admitting air into the chambers or compartments and allowing for the drainage of water therefrom by the tipping of the receptacle at either end.

Figures 2, 5:
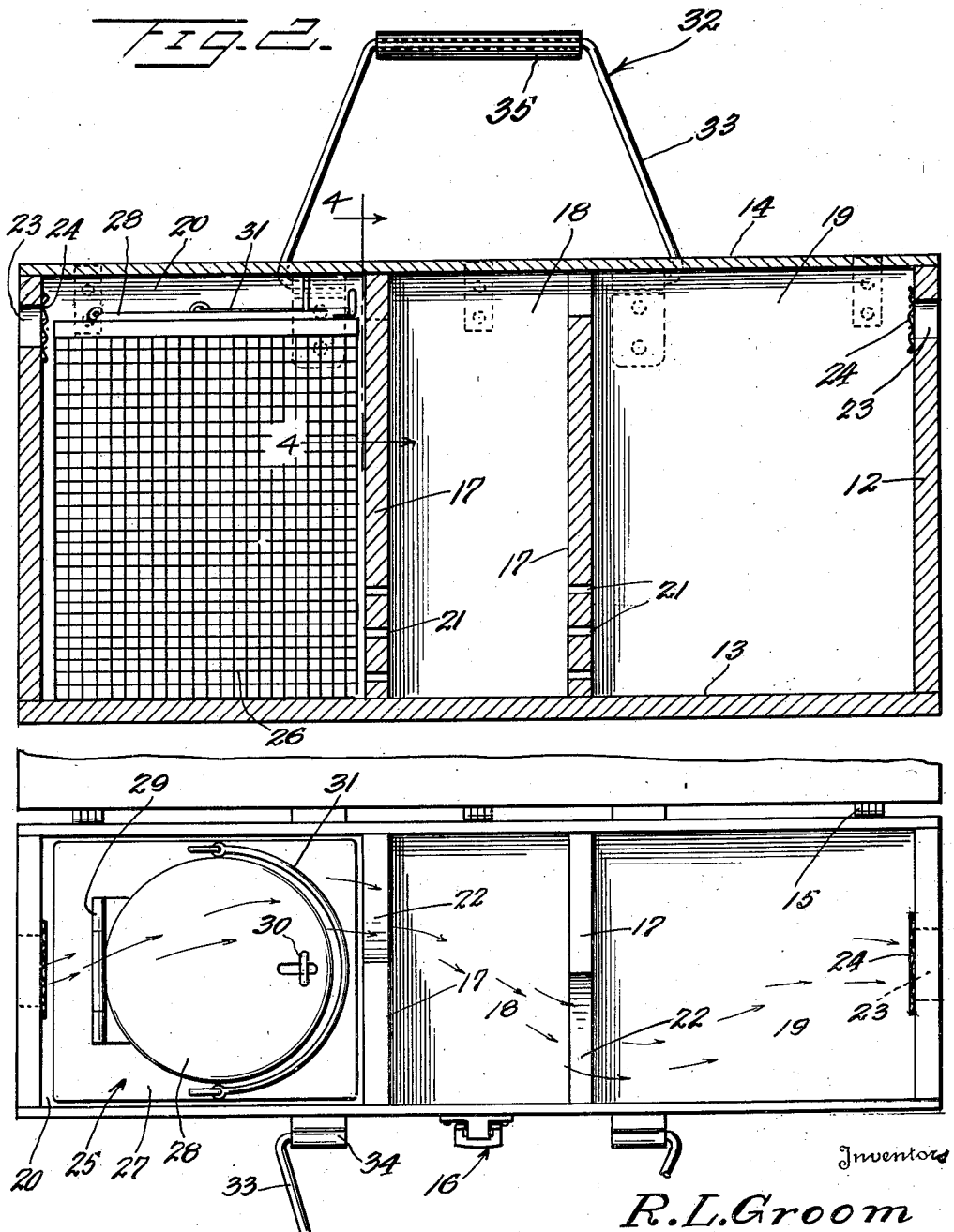
Figure 2 is a vertical, longitudinal central section of the same.
Figure 5 is a view in top plan of the receptacle with the cover open, the cover being only partly shown.

The chambers 19 and 20 are of substantially the same dimensions and there is provided for introduction into one of them, such as the chamber 20 as illustrated in Figure 2, the wire mesh basket 25, the side walls 26 and bottom of which are of screen fabric while the top 27 is formed of imperforate material and has a single opening, not shown, which is covered by the lid 28. This lid is hinged to the top as indicated at 29 and is secured down by the latch 30. A bail or handle 31 is also attached to the top of the wire mesh receptacle so that the same may be conveniently lifted from its compartment. This handle may also be employed to secure or tether the receptacle to the side of the boat or other body when it is desired to place the same in a stream so, that the bait or captured fish may be kept in running water.

The numeral 32 generally designates the carrying handle for the box. This handle is formed in two sections or portions each of which comprises a substantially U shaped bail attached at its ends by the hinge ears 34, to one side wall of the receptacle, so that the intermediate portions of the two bails, which are here shown as being provided with coverings 35, preferably in the form of rubber tubes, may be brought together above the longitudinal center of the cover 14 for the convenient carrying of the receptacle.

It will be readily seen, upon reference to Figure 1 of the drawings, that when the two portions of the carrying handle are brought together each portion will extend across a longitudinal edge of the cover 14 and thus the cover will be prevented from opening accidentally if the securing latch 16 is unfastened. This is particularly important when the receptacle is tipped for the discharge of water from either of the end wall openings 23. This allows for the changing of the water in the receptacle without danger of the fish in the compartment 19 escaping by the accidental opening of the receptacle cover.

There are several advantages derived from the construction of this bait and fish box or receptacle in the rectangular design illustrated. The shape and size, being similar to that of a suit case, makes the carrying easier and makes it suitable as a seat in a boat. The rectangular design is also much better than the round designs such as are frequently used in a bait receptacle, for the reason that minnows congregate in the corners and remain still and do not become exhausted from continuous swimming, whereas, in round receptacles they continue to swim in circles and therefore use up their energy and also the oxygen in the water.

The present receptacle may be made either of metal or wood, but wood construction is preferred particularly for use in hot climates since wood does not absorb heat as rapidly as metal and therefore the temperature of the inside of the receptacle will remain low for a longer period than would be the case if the receptacle were of metal construction.

By forming the openings 22 in the top edges of the positioned walls 17, at remote sides of the box it will be readily apparent that a tortuous pathway is provided for the circulation of air through the upper part of the box from one end to the other. Consequently the maximum amount of contact between the air, the water and the refrigerant, will be obtained so that the water in the end chambers will be maintained at the desired temperature and will be kept well aerated.

We claim:

A bait and fish receptacle, comprising a relatively long rectangular box having two transverse partition walls disposed in relatively close proximity one to the other and adjacent to the longitudinal center of the box to divide the box into a central compartment and two end compartments, a cover pivotally attached to one longitudinal side of the box and adapted to close all of the compartments, the highest part of the top edge of each partition lying in the plane of the top of the box to be engaged by the cover when closed, each of said partition walls having only one recess formed in the top edge adjacent one side of the box, the recess of one wall being at the opposite side of the box from the recess of the other wall, the partition walls having apertures therethrough adjacent the bottom of the box, handle means connected with the side walls of the box for carrying the latter, and means for admitting air into the top part of each of the two end compartments.

ROY L. GROOM.
ROGER E. PARRISH, Sr.